United States Patent Office 3,557,113
Patented Jan. 19, 1971

3,557,113
METHOD OF PREPARING GUANINE, ISOGUANINE, AND 7-METHYL DERIVATIVES THEREOF
Yoshitaka Yamada and Izumi Kumashiro, Tokyo, Japan, assignors to Ajinomoto Co., Inc., Tokyo, Japan
No Drawing. Filed Sept. 18, 1967, Ser. No. 668,661
Claims priority, application Japan, Sept. 19, 1966, 41/61,861, 41/61,863
Int. Cl. C07d 57/64
U.S. Cl. 260—252
6 Claims

ABSTRACT OF THE DISCLOSURE

Guanine and isoguanine are obtained when 5-carbamoyl-4-imidazolecarboxamidoxime is reacted with the chloride of an organic sulfonic acid in an aqueous solution at least 2-normal with respect to an alkali metal hydroxide. The yield of the two compounds and their ratio vary with the reaction temperature and the proportions of the reactants. 7-methylguanine and 7-methylisoguanine are formed under the same conditions from 1-methyl-5-carbamoyl-4-imidazolecarboxamidoxime.

BACKGROUND OF THE INVENTION

The invention relates to a method of preparing guanine, isoguanine, and their 7-methyl derivatives by synthesis.

Guanine was first synthesized late in the 19th century by Fischer (Ber. 30, 2226 (1897)) and several improved methods were proposed more recently (J.A.C.S. 70, 3109; 75, 263—J. Chem. Soc. 1952, 3721; Agr. Biol. Chem. 26, 624; J. Org. Chem. 23, 2010). It is a common feature of the best known methods that their starting material is ethyl cyanoacetate which is converted to guanine in a multiplicity of relatively complex reactions. Some known methods require expensive reagents other than ethyl cyanoacetate.

Guanine, isoguanine, and their 7-alkyl derivatives are known intermediates for the preparation of pharmacologically useful compounds, and for the preparation of guanylic acid and similar compounds which have found applications as seasoning agents.

SUMMARY OF THE INVENTION

We have found that purine derivatives of the formula:

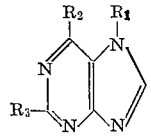

wherein $R_1$ is hydrogen or methyl, one of $R_2$ and $R_3$ is amino and the other is hydroxyl, are formed when 5-carbamoyl-4-imidazolecarboxamidoxime or 1 - methyl-5-carbamoyl-4-imidazolecarboxamidoxime is reacted with the chloride of an organic sulfonic acid in an aqueous solution at least two-normal with respect to an alkali metal hydroxide. The starting materials of this invention, which will be referred to hereinafter as CIAO and Me—CIAO are imidazole derivatives of the following formulas:

CIAO: 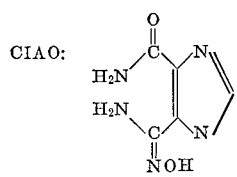   Me—CIAO: 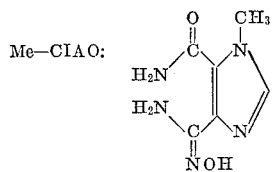

CIAO and Me—CIAO were not prepared heretofore, but are readily formed from 4-cyano-5-imidazolecarboxamide and 1-methyl - 4 - cyano-5-imidazolecarboxamide which have the formula:

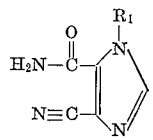

wherein $R_1$ is hydrogen or methyl, by reaction with hydroxylamine by a known reaction applicable to many nitriles. The reaction is performed in water, methanol, ethanol, or a mixture of these solvents, 1–3 moles hydroxylamine being employed per mole of the nitrile. The reaction proceeds relatively slowly at room temperature, and is best performed at 60° C. to 70° C. An equilibrium between the nitrile and the amidoxime is established in the liquid, and the yield is improved by the use of a solvent, such as methanol, in which the amidoxime is only sparingly soluble. If water is used as a solvent, the reaction should be performed at room temperature to reduce the solubility of the amidoxime.

Free hydroxylamine, because of its instability, is preferably formed in the reaction medium from hydroxylamine hydrochloride or sulfate and an equivalent amount of alkali metal hydroxide, or alkali metal alcoholate.

4-cyano-5-imidazolecarboxamide is prepared according to the method of the French Pat. No. 1,437,211. 1-methyl-4-cyano - 5 - imidazolecarboxamide is a new compound which is obtained by reacting the silver salt of 4,5-dicyanoimidazole with methyl iodide, or by reaction 4,5-dicyanoimidazole with dimethyl sulfate in a weakly alkaline aqueous solvent to form 1-methyl-4,5-dicyanoimidazole which may further be hydrolyzed to 1-methyl-4-cyano-5-imidazolecarboxamide in the manner described in the afore-mentioned French patent.

If CIAO or Me—CIAO are prepared by the methods outlined above, they are obtained as solutes in alkaline media, and need not be isolated from the same for performing the subsequent rearrangement to purine derivatives. If CIAO is produced in an alkaline aqueous medium from 4,5-dicyanoimidazole, itself available from hydrogen cyanide and ammonia in a single-step reaction, guanine may be prepared from 4,5-dicyanoimidazole in a sequence of reactions at an overall yield of 80% without isolation of the intermediates.

We are not aware of a chloride of an organic sulfonic acid which would not cause the molecular rearrangement and removal of water which leads from CIAO and Me—CIAO to guanine, isoguanine and their 7-methyl derivatives. The sulfonic acid chloride which are commercially available at low cost and which can be handled conveniently are benzenesulfonyl chloride, o- and p-toluenesulfonyl chloride, methanesulfonyl chloride, and ethanesulfonyl chloride, which are solid at room temperature or liquids boiling at about 150° C. or higher. They may be used in our method with closely similar results and are preferably employed in amounts of 1 to 5 moles per mole of CIAO or Me—CIAO for good yields.

While all alkali metal hydroxides may be used in our method, we prefer to employ sodium hydroxide and potassium hydroxide because of their low cost. The aqueous reaction medium should be at least 2-normal with respect to the alkali metal hydroxide and the operative concentration of the latter is limited practically by its solubility only, and the upper limit is 10 normal. The medium should be held at a temperature at which it is liquid, but the reaction is normally performed at ambient temperature or at higher temperatures up to the boiling point.

The mole ratio of sulfonic acid chloride to CIAO or Me—CIAO, the concentration of the alkali metal hydroxide, and the reaction temperature affect the yield and ratio of the reaction products. At reaction temperatures below 70° C., the yield of isoguanine from CIAO increases with increasing ratio of sulfonic acid chloride to CIAO regardless of the alkali metal hydroxide concentration. When the reaction medium is 2-normal to 5-normal with respect to alkali metal hydroxide, isoguanine is obtained in high yields regardless of the reaction temperature. When the reaction medium is more than 5-normal in alkali metal hydroxide, the yield of guanine increases with the maximum reaction temperature. At alkali metal concentrations lower than 2-normal, the yield of isoguanine decreases, and 4-cyano-5-ureido-imidazole is predominantly formed.

The amount of alkali metal hydroxide in the reaction medium should be between 2 and 50 moles per mole of CIAO or Me—CIAO. For high yields of guanine, the ratio should be between 10:1 and 30:1, the medium should be at least 5-normal with respect to the alkali metal hydroxide, the initial reaction temperature between 10° and 60° C. for 30 minutes and 4 hours (longer time than 4 hours has not bad effect), and should then be followed by heating to the boiling point for one to 3 hours (longer time than 3 hours has no bad effect).

The desired reaction products are readily separated from the reaction mixture by neutralizing the latter with any convenient acid. The products may be separated from each other by fractional adsorption or recrystallization.

DESCRIPTION OF PREFERRED EMBODIMENTS

The invention is further illustrated by the following examples, and it will be understood that the invention is not limited thereto.

Example 1

One mole of CIAO was reacted with varying amounts of benzenesulfonyl chloride at varying reaction temperatures in five liters of 6-normal aqueous sodium hydroxide solution for one hour. The yields of guanine and/or isoguanine based on CIAO are listed in Table 1 for the various reaction temperature and mole ratios of benzene sulfonyl chloride to CIAO.

TABLE 1

| Moles benzenesulfonyl chloride | Guanine, percent | | | | | Isoguanine, percent | | | | |
|---|---|---|---|---|---|---|---|---|---|---|
| | 25–30 | 50 | 80 | 90 | 100 | 25–30 | 50 | 80 | 90 | 100 |
| 1.0 | 31 | 31 | 27 | 33 | 27 | 22 | 39 | 11 | 0 | 0 |
| 1.5 | 12 | 16 | 27 | 30 | 36 | 34 | 32 | 23 | 17 | 0 |
| 2.0 | 0 | 0 | 23 | 35 | 41 | 60 | 60 | 39 | 23 | 0 |
| 3.0 | | | | | 52 | | | | | |
| 5.0 | | | | | 45 | | | | | 0 |

Example 2

420 ml. of a 0.25-N aqueous NaOH solution (0.105 mole) was mixed with 7.3 g. (0.105 mole) hydroxylamine hydrochloride, and the solution formed was further mixed with 13.6 g. (0.1 mole) 4-cyano-5-imidazolecarboxamide. After the mixture had been held at ambient temperature (20° C.) for five hours, the crystalline precipitate formed was filtered off, washed with water and dried. It consisted of 15.0 g. CIAO (89% yield) having a melting point of 237.5–238° C. (decomp.), an $R_f$ value of 0.42 in a 4:1:1 mixture (by volume) of n-butanol, acetic acid, and water, an $R_f$ value of 0.49 in a 20:12:3 mixture of n-propanol, concentrated ammonium hydroxide solution and water, and ultraviolet absorption band of $\lambda_{max}=264-265$ m$\mu$ (pH 1) and $\lambda_{max}=230, 259$ (S), 300 m$\mu$ (pH 11). This compound was identified by its elementary analysis:

Calculated for $C_5H_7O_2N_5$ (percent): C, 35.50; H, 4.17; N, 41.41. Found (percent): C, 35.67; H, 4.44; N, 41.31.

The filtrate was found by paper chromatography to contain 5% unreacted 4-cyano-5-imidazolecarboxamide, most of which could be recovered in crystalline form by partly evaporating and neutralizing the liquid.

When the reaction mixture was held at 40° C. for four hours instead of 20° C. in a second run, the yield of CIAO was 85%, and 10% of the unreacted starting material was recovered. After, the reaction mixture of a third run was held two hours at 60° C., the CIAO yield dropped to 70%, but 25% of the unreacted 4-cyano-5-imidazolecarboxamide could be recovered from the mother liquid.

A CIAO yield of 95% was achieved when a mixture of 210 ml. 0.5-N NaOH solution (0.105 mole) with 210 ml. methanol, 7.3 g. (0.105 mole) hydroxylamine hydrochloride, and 13.6 g. (0.1 mole) 4-cyano-5-imidazolecarboxamide was kept at 3.5 hours at 20° C. before the crystals formed were isolated by filtration, washed and dried.

Example 3

13.0 g. (0.6 mole) sodium metal were dissolved in 300 ml. methanol, 41.6 g. (0.6 mole) hydroxylamine hydrochloride were added, the mixture was stirred for three hours at 20° C. and then kept at this temperature overnight. It was filtered, and the filtrate was mixed with 27.2 g. (0.2 mole) 4-cyano-5-imidazolecarboxamide and stirring was continued for 3½ hours at 20° C. The crystals precipitated were filtered off, washed with water and dried. They consisted of 32.6 g. CIAO (97% yield) which was identified by its melting point after recrystallization from aqueous methanol.

Example 4

14.3 g. dimethyl sulfate were added drop by drop with stirring to 100 ml. of an aqueous solution containing 11.8 g. (0.1 mole) 4,5-dicyanoimidazole and 14.3 g. (0.17 mole) sodium bicarbonate and having a temperature of 50–60° C. The addition required 30 minutes, and the mixture was further stirred at the same temperature for 30 minutes. It was then cooled to room temperature and extracted with ethyl acetate. The extract was dried and evaporated to dryness in a vacuum. The residue of 1-methyl-4,5-dicyanoimidazole weighed 12.5 g. (95% yield). The compound had a melting point of 89–89.5° C., an $R_f$ value of 0.88 in the afore-mentioned mixture of butanol, acetic acid, and water, and a UV absorption band at $\lambda_{max}=249$ m$\mu$ (pH 1 and pH 11).

63 g. 1-methyl-4,5-dicyanoimidazole, prepared as described above, were dissolved in 1 liter of a 1:1 mixture of water and alcohol containing 20 g. NaOH, and the solution was kept at 20° C. for 40 minutes. Its pH was then adjusted to 7, and it was evaporated in a vacuum to 250 ml. The crystals precipitated from the concentrate upon cooling were filtered off, washed with hot ethanol and recrystallized from hot water. 25.3 g. pure 1-methyl-4-cyano-5-imidazolecarboxamide were thus obtained.

The compound has a melting point of 212–212.5° C., and $R_f$ value of 0.76 in the afore-mentioned mixture of propanol, ammonium hydroxide, and water, UV absorption bands at $\lambda_{max}=252$ m$\mu$ (pH 1) and 248 m$\mu$ (pH 11). It was identified by elementary analysis:

Calculated for $C_6H_6N_4O$ (percent): C, 48.00; H, 4.03; N, 37.32. Found (percent): C, 48.10; H, 4.16; N, 37.24.

7.5 g. (0.05 mole) 1-methyl-4-cyano-5-imidazolecarboxamide were added to a hydroxylamine solution prepared from 2.3 g. (0.1 mole) sodium metal, 50 ml. methanol, and 6.95 g. (0.1 mole) hydroxylamine hydrochloride, and the mixture was stirred for four hours at 20° C. The crystals formed were recovered by filtration, washed with water and dried. They weighed 8.9 g. (87% yield), had a melting point of 207.5–208° C., an $R_f$ value of 0.65 in the afore-mentioned mixture of propanol, ammonium hydroxide, and water, and UV absorption bands at $\lambda_{max}=255$ m$\mu$ (S) (pH 1) and $\lambda_{max}=231$ m$\mu$, 300–302 m$\mu$ (pH 11). The compound was identified as Me—CIAO by its elementary analysis:

Calculated for $C_6H_9N_5O_2$ (percent): C, 39.34; H, 4.95; N, 38.24. Found (percent): C, 39.25; H, 4.80; N, 38.39.

Example 5

3.38 g. (0.02 mole) CIAO and 7.06 g. (0.04 mole) benzene-sulfonyl chloride were added to 50 ml. 6-N aqueous sodium hydroxide solution (0.30 mole NaOH), and the mixture was heated quickly to 100° C. and refluxed for 45 minutes. It was cooled to room temperature, neutralized with concentrated hydrochloric acid, and stored in an icebox until crystals formed which were filtered off, washed with water and dried. They weighed 2.32 g. and contained 67.5% guanine as determined by quantitative paper chromatography using a 160:25:120 mixture of saturated ammonium sulfate solution, isopropanol and water as a developing solvent. The yield of guanine thus was 52%, based on the CIAO employed. The crystals were practically free of isoguanine.

Pure crystalline guanine was obtained by dissolving the crystals in dilute sulfuric acid and neutralizing the acid solution and was identified by its elementary analysis:

Calculated for $C_5H_5N_5O$ (percent): C, 39.73; H, 3.33; N, 46.34. Found (percent): C, 39.41; H, 3.53; N, 46.06.

When the same procedure was repeated, but the reaction mixture was refluxed for two hours instead of 45 minutes, the yield of guanine was increased 58%. A yield of 84% was achieved when the mixture of CIAO, benzenesulfonyl chloride, and sodium hydroxide solution was stored 3 hours at 30° C. prior to refluxing for two hours. The yield was further increased when the storage temperature was raised from 30° C. to 50° C.

Example 6

The general procedure of Example 5 was repeated in several runs in which benzenesulfonic acid was replaced by equimolecular amounts of o-toluenesulfonyl chloride, p-toluenesulfonyl chloride, and methanesulfonyl chloride. In each of these runs, the reaction mixture was first stirred for 3 hours at 50° C. and thereafter refluxed for two hours. o-Toluenesulfonyl chloride produced 2.65 g. crude crystals containing 93% guanine for a yield of 83%. Under the same conditions, p-toluenesulfonyl chloride and methanesulfonyl chloride respectively produced 2.70 and 2.43 g. of crude crystals having a purity of 68.1 and 63.7% for guanidien yields of 61 and 51% respectively. Substantially, the same results were obtained with ethanesulfonyl chloride.

Example 7

3.66 g. (0.02 mole) Me—CIAO were substituted in the general procedure of Example 5 for the CIAO used there, the reaction mixture being quickly heated to 100° C. and refluxed for 45 minutes. The crude crystals obtained weighed 2.10 g., and 1.01 g. pure, crystalline 7-methylguanine sulfate (24% yield) were recovered when the crude product was recrystallized from dilute sulfuric acid. The salt had a melting point higher than 300° C., and showed a single spot on paper chromatography. Its $R_f$ value and UV absorption spectrum was identical with that of the known product (J. Org. Chem. 27 (1), 883, 1962), and it was further identified by its elementary analysis:

Calculated for $C_6H_7N_5O \cdot \frac{1}{4}H_2SO_4 \cdot H_4O$ (percent): C, 34.70; H, 4.61; N, 33.72. Found (percent): C, 35.80; H, 4.32; N, 33.74.

The yield of 7-methylguanine could be raised to 58% by first stirring the reaction mixture at 50° C. for three hours, and thereafter refluxing it for two hours.

Example 8

5.5 g. (0.03 mole) Me—CIAO and 10.6 g. (0.06 mole) benzene sulfonyl chloride were mixed with 75 ml. 6-N aqueous NaOH solution, and the mixture was heated to 90° C. for 45 minutes. It was then cooled and neutralized with concentrated hydrochloric acid. The crystals formed were filtered, washed and dried. They weighed 3.5 g., and were found by paper chromatography to contain 1.48 g. 7-methylguanine and 1.19 g. 7-methylisoguanine for respective yields of 30% and 24%.

What is claimed is:

1. A method of preparing a purine derivative of the formula:

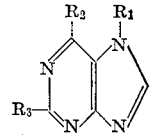

which comprises reacting an imidazole derivative of the formula:

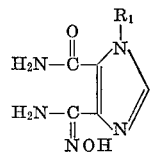

with the chloride of an organic sulfonic acid selected from the group consisting of benzenesulfonic acid, o- or p-toluenesulfonic acid, methanesulfonic acid, or ethanesulfonic acid, in an aqueous solution of an alkali metal hydroxide of which concentration is 2–10 normal until said purine derivative is formed, in said formulas $R_1$ being hydrogen or methyl, one of $R_2$ and $R_3$ being hydroxyl and the other amino.

2. A method as set forth in claim 1, wherein the mole ratio of said alkali metal hydroxide to said imidazole derivative in said aqueous solution is between 2:1 and 50:1.

3. A method as set forth in claim 1, wherein the mole ratio of said chloride to said imidazole derivative is between 1:1 and 5:1.

4. A method as set forth in claim 1, wherein said imidazole derivative is formed prior to said reacting from a compound of the formula:

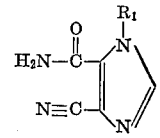

by reaction with hydroxylamine in a liquid solvent selected from the group consisting of water, methanol, and ethanol.

5. A method as set forth in claim 4, wherein the mole ratio of said hydroxylamine to said compound is between 1:1 and 3:1.

6. A method as set forth in claim 1, wherein said $R_2$ is hydroxyl and said $R_3$ is amino, wherein said aqueous solution is at least five-normal with respect to said alkali metal hydroxide, the mole ratio of said alkali metal hydroxide to said imidazole derivative is between 10:1 and 30:1, the mole ratio of said chloride to said imidazole derivative is between 1:1 and 5:1, the temperature of said solution is held initially at 10–60° C. for at least 30 minutes during said reacting, and said solution thereafter is heated to the boiling point thereof for at least one hour.

References Cited

UNITED STATES PATENTS 3,398,149   8/1968   Morita et al. _____ 260—252

ALEX MAZEL, Primary Examiner

A. M. TIGHE, Assistant Examiner

U.S. Cl. X.R.

260—309